United States Patent
Weber et al.

(10) Patent No.: US 9,809,191 B2
(45) Date of Patent: Nov. 7, 2017

(54) PYROTECHNIC IGNITER

(71) Applicant: Autoliv Development AB, Vårgårda (SE)

(72) Inventors: Marcus Weber, Untertheres (DE); Raimund Nebel, Obermeitlingen (DE); Andreas Guggenberger, München (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 15/030,322

(22) PCT Filed: Oct. 24, 2014

(86) PCT No.: PCT/EP2014/072873
§ 371 (c)(1),
(2) Date: Apr. 18, 2016

(87) PCT Pub. No.: WO2015/059285
PCT Pub. Date: Apr. 30, 2015

(65) Prior Publication Data
US 2016/0272145 A1 Sep. 22, 2016

(30) Foreign Application Priority Data

Oct. 25, 2013 (FR) ..................................... 13 60458

(51) Int. Cl.
*B60R 21/26* (2011.01)
*F42B 3/103* (2006.01)
(Continued)

(52) U.S. Cl.
CPC ................ *B60R 21/26* (2013.01); *F42B 3/04* (2013.01); *F42B 3/103* (2013.01); *F42B 3/26* (2013.01);
(Continued)

(58) Field of Classification Search
CPC . B60R 21/26; B60R 2021/26029; F42B 3/04; F42B 3/103; F42B 3/26; F42C 19/08
See application file for complete search history.

(56) References Cited

U.S. PATENT DOCUMENTS

| 5,378,011 A | 1/1995 | Rogerson et al. |
| 5,433,147 A | 7/1995 | Brede et al. |

(Continued)

FOREIGN PATENT DOCUMENTS

| DE | 8417618 U1 | 10/1985 |
| DE | 4307774 A1 | 9/1994 |

(Continued)

OTHER PUBLICATIONS

International Search Report for PCT/EP2014/072887, ISA/EP, Rijswijk, NL, (English and French) dated Nov. 25, 2014.
(Continued)

*Primary Examiner* — Drew J Brown
(74) *Attorney, Agent, or Firm* — Stephen T. Olson; Harness, Dickey & Pierce, P.L.C.

(57) ABSTRACT

A pyrotechnic igniter includes at least one pyrotechnic material designed to be ignited by a heating element, a case enclosing the at least one pyrotechnic material, and a plastic overmoulding of the case, forming a fixation interface of the igniter and designed to be inserted into a fixation orifice of a support up to an inserted position. The fixation interface of the plastic overmoulding includes at least one deformable part designed to elastically deform during passage into the fixation orifice and assume during an elastic return a blocking position against the support when the igniter is in the inserted position in order to prevent any withdrawal of the igniter.

15 Claims, 3 Drawing Sheets

(51) Int. Cl.
*F42B 3/26* (2006.01)
*F42B 3/04* (2006.01)
*F42C 19/08* (2006.01)

(52) U.S. Cl.
CPC .... *F42C 19/08* (2013.01); *B60R 2021/26029* (2013.01)

(56) References Cited

U.S. PATENT DOCUMENTS

| | | | |
|---|---|---|---|
| 5,560,643 A | 10/1996 | Lang et al. | |
| 5,596,163 A | 1/1997 | Caflisch et al. | |
| 5,791,682 A | 8/1998 | Hiramitsu et al. | |
| 6,601,515 B2 | 8/2003 | Bretfeld et al. | |
| 7,980,591 B2 | 7/2011 | Schonhuber et al. | |
| 8,083,259 B2 | 12/2011 | Schonhuber et al. | |
| 8,783,713 B2 | 7/2014 | Muscat et al. | |
| 2002/0056394 A1 | 5/2002 | Bretfeld et al. | |
| 2002/0145275 A1* | 10/2002 | Hosey | B60R 21/272 280/741 |
| 2009/0167006 A1 | 7/2009 | Schonhuber et al. | |
| 2009/0179408 A1* | 7/2009 | Brisighella, Jr. | B60R 21/26 280/741 |
| 2009/0309342 A1 | 12/2009 | Schonhuber et al. | |
| 2010/0090445 A1 | 4/2010 | Williams et al. | |
| 2013/0119645 A1 | 5/2013 | Eckert et al. | |
| 2013/0328292 A1 | 12/2013 | Muscat et al. | |
| 2015/0343982 A1 | 12/2015 | Fechner et al. | |

FOREIGN PATENT DOCUMENTS

| | | | |
|---|---|---|---|
| DE | 19654314 A1 | 6/1998 | |
| DE | 10024664 A1 | 11/2001 | |
| DE | 102005058721 A1 | 6/2007 | |
| EP | 0744323 A1 | 11/1996 | |
| JP | EP-1870301 A1 * | 12/2007 | ............. B60R 22/26 |
| WO | WO-2012/072234 A1 | 6/2012 | |
| WO | WO-2013/017228 A1 | 2/2013 | |
| WO | WO-2014/128121 A1 | 8/2014 | |

OTHER PUBLICATIONS

Written Opinion of the ISA for PCT/EP2014/072887, ISA/EP, Rijswijk, NL, (French) dated Nov. 25, 2015.
International Search Report for PCT/EP2014/072873, ISA/EP, Rijswijk, NL, with English translation, dated Jan. 16, 2015.
Written Opinion of the ISA, ISA/EP, dated Jan. 16, 2015.

* cited by examiner

PYROTECHNIC IGNITER

CROSS-REFERENCE TO RELATED APPLICATIONS

This application is a 371 U.S. National Stage of International Application No. PCT/EP2014/072873, filed Oct. 24, 2014. This application claims the benefit of and priority to French Patent Application No. 1360485, filed Oct. 25, 2013. The disclosures of the above applications are incorporated herein by reference.

FIELD

The present invention relates in a general manner to a pyrotechnical igniter for being mounted on a safety module for an automobile.

BACKGROUND

The mounting of pyrotechnical igniters on an interface piece which is then fixed to the safety module for correctly positioning the igniter relative to this module is known in the prior art. On the other hand, this system has in particular the disadvantage of increasing the number of components and therefore also the cost and the assembly time of the safety module.

Such a mounting is illustrated, for example, in the document US2010090445.

SUMMARY

A goal of the present invention is to respond to the disadvantages of the document of the prior art cited above and in particular to first of all propose an igniter that facilitates the mounting on a safety module.

To this end a first aspect of the invention concerns a pyrotechnical igniter comprising:
  at least one pyrotechnical material designed to be ignited by a heating element,
  a case enclosing said at least one pyrotechnical material,
  a plastic overmoulding of the case, forming a fixation interface of the igniter and designed to be inserted into a fixation orifice of a support up to an inserted position, characterized by that:
  the fixation interface of the plastic overmoulding comprises at least one deformable part designed so that it can elastically deform during its passage into the fixation orifice and assume during its elastic return a blocking position against the support when the igniter is in the inserted position in order to prevent any withdrawal of the igniter. The fixation interface of the plastic overmolding of the igniter comprises a deformable part, otherwise called a deformable foot. Furthermore, this deformable part is designed to deform or to become taut during its passage into the fixation orifice and to assume by an elastic return or relaxation a blocking position once the igniter has been inserted. It is therefore no longer necessary to provide an intermediate piece and the fixation by blocking (or clipping) can be implemented in a particularly rapid manner.

The case advantageously comprises a lateral wall and a bottom with a thickness greater than that of the lateral wall. The risks of rupture and/or of detachment of the petals of the case during the operation of the igniter, causing an opening on the sudden pressure of the case, are reduced with this implementation. This furthermore allows the angular amplitude of the opening of the petals and the inflation of the case to be limited and to therefore reduce the stresses on the plastic overmolding during the igniting of the igniter.

The case advantageously comprises a bottom with weakened lines designed to cause a petaling of the bottom during the operation of the igniter and the number of petals is less than eight. This implementation improves the resistance to rupture of the petals during the operation.

The case is advantageously arranged in a pit of the plastic overmolding at a depth greater than or equal to one half the diameter of the case. This avoids petals from extending out beyond the overmolding pit and therefore any attack of an outside element on the pyrotechnical igniter such as a fabric of the airbag.

The pit has a diameter two to three millimeters greater than that of the case. The deployment of the petals is optimal with this implementation; the petals find no support on the pit during their opening and therefore do not risk damaging it. This furthermore allows the realising of a moulding tool for realising the plastic overmoulding which is sufficiently massive to avoid any erosion during the injection and to therefore avoid any premature wear of the mould. Finally, this allows the igniter to be correctly maintained during the operation of overmoulding and therefore pieces of constant dimensions.

Said at least one deformable part advantageously comprises a blocking face on the support and the pit comprises an exiting end of the gasses from the igniter arranged at a distance from said blocking face greater than or equal to 15 millimeters. This implementation allows the leaks to be limited by the fixation of the igniter on the support.

The pit advantageously has a depth of between 5 and 10 millimeters, limits included.

The igniter advantageously comprises elongated connection pins and the pit has an axial direction basically parallel to the connection pins. The axial direction can be defined, for example, by an axis of symmetry of an igniter case.

The plastic overmoulding advantageously forms a connection imprint at the level of the connection pins designed to receive and retain a connector. The connector is advantageously a male connector.

The igniter advantageously comprises a cross-connector of glass to which the case is fixed by a welding and said at least one deformable part is arranged on the plastic overmolding facing a case zone between the welding and the case bottom. During the operation of the igniter the case has a tendency to inflate above the welding with the cross-connector of glass. The maximum deformation and therefore the maximum stress of the overmolding will be found at the level of the contact zone between the case and the overmolding, between the welding and the case bottom. According to this implementation, facing this zone the deformable part or parts also act as reinforcement ribs.

The welding is advantageously arranged to be facing the support when the igniter is in the inserted position. The support participates in the resistance of the welding and supplies it with a recovery of stress.

The plastic overmolding is advantageously made of polyamide 6.6 with 30% by mass of glass fibres.

A second aspect of the invention relates to a device for fixing an electro-pyrotechnical igniter, comprising:
  a support comprising an orifice for the fixation of the igniter,
  the igniter according to the first aspect,
in which:
  the support comprises a checking opening, the deformable part comprises a male part of which a first part faces the checking opening when the deformable part has passed into the blocking position. This implementation allows a check of the presence of the deformable part after mounting.

The male part advantageously comprises a second part, with a greater surface than the first part, which faces the checking opening when the igniter is in the inserted position with the deformable part remaining deformed. This implementation allows a check to be made that the deformable part is in a good blocking position after insertion.

A third aspect of the invention relates to an automobile safety module comprising at least one airbag and a device according to the second aspect.

The airbag is advantageously arranged between the support and the igniter. The resistance of the assembly is improved with the participation of the igniter to keep the airbag in place. Alternatively, the safety module is simplified because the fixation device concurrently contains the functions of positioning the igniter and the bag.

The igniter advantageously communicates directly with the airbag.

The device advantageously comprises at least one projecting part and the airbag comprises a hole into which the projecting part is threaded in order to position/maintain the airbag on the device. This implementation improves the manufacture of the safety module because the projecting part allows the prepositioning of the bag before the step of mounting the igniter. Furthermore, the sandwich hold prevents the hole of the airbag from exiting from the projecting part, therefore rendering the retention and the fixation of the airbag reliable. According to this implementation the hole can be added on the projecting part, which offers a function of prepositioning the airbag on the activating device during the mounting. Therefore, the mounting can be broken down into a first stage of prepositioning the airbag through its hole, which can be positioned on a tongue, followed by a second stage of mounting the igniter or the activating device on the module, for example.

The hole is advantageously designed to be mounted tightly on the projecting part. According to this implementation the prepositioning is more robust.

Said at least one projecting part advantageously comprises two indexes arranged on the igniter support and the igniter comprises recesses designed to receive the indexes. This reduces the risk of escape from the airbag during its deployment since the degrees of freedom of the tongues (on which the holes of the airbag are arranged) are therefore limited and ensures a keyway for the airbag relative to the igniter support.

The igniter is advantageously arranged to inflate only the airbag. In other words, there is no secondary charge outside of the igniter.

According to an embodiment the igniter is designed to pressurize the airbag to an absolute pressure of 30 bars maximum.

The module advantageously comprises:
an airbag with a vent,
a linkage connecting the airbag and the vent.

The linkage connected to the airbag advantageously keeps the vent closed, the linkage is designed to be detached from the airbag when the latter is inflated, and the igniter, when it is ignited, is designed to inflate the airbag.

The linkage is advantageously connected to the airbag by a meltable seam designed to break during an inflation of the airbag caused by an ignition of the igniter.

The module advantageously comprises a housing and the ignition support is a part of the housing. The general structure of the module is simplified.

According to an embodiment the airbag is designed to retain an occupant of the vehicle during a collision and the airbag is designed to carry out an order of a mechanism of the safety module.

A last aspect of the invention concerns an automobile comprising at least one igniter according to the first aspect, and/or a security module according to the third aspect.

DESCRIPTION OF THE DRAWINGS

Other characteristics and advantages of the present invention will appear more clearly from a reading of the detailed following description of an embodiment of the invention given by way of non-limiting example and illustrated by the attached drawings, in which.

DETAILED DESCRIPTION

Figure 1:
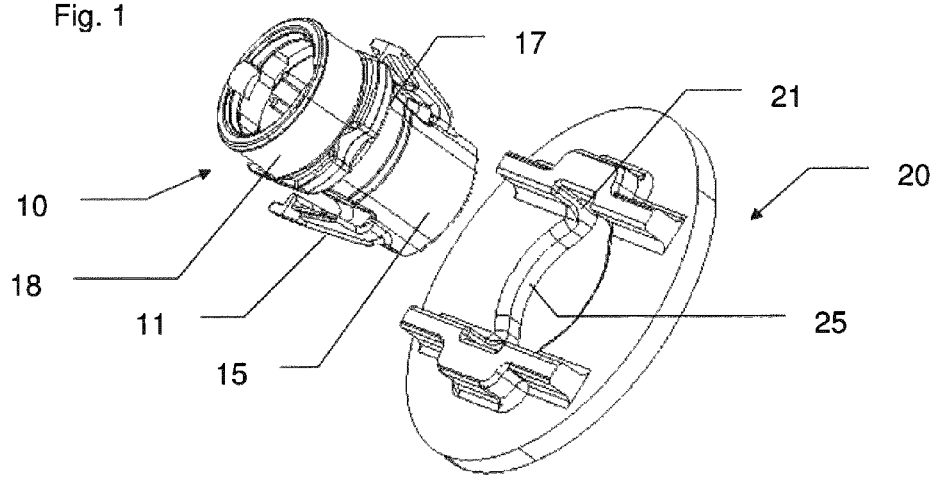
FIG. 1 shows a perspective view of an igniter according to the present invention with a support.

FIG. 1 shows an igniter 10 and a support 20 in which the igniter 10 is to be inserted. The igniter 10 comprises a plastic overmolding 18 of which one outer part forms a cylinder 15 that has a diameter corresponding substantially to a diameter of a bore 25 of the support 20, forming a fixation orifice for the igniter 10.

Therefore, the cylinder 15 can be inserted into the bore 25 until a shoulder 17 makes contact with the support 20, thus defining an inserted position of the igniter 10 in the support 20.

The igniter 10 also comprises two feet 11 each of which forms a deformable part of the plastic overmolding 18. These feet 11 can fit into passages 21 of the bore 25 during the insertion of the igniter 10 but they also deform elastically. However, when the igniter 10 arrives at the inserted position, the length of the feet 11 is calculated so that they can deploy or release by elastic return behind the shoulder of the passages 21 and assume a blocking position supported against the shoulders of the passages 21.

Once in a position of blocking, the feet 11 are supported on the shoulders of the passages 21 of the support 20 and block any withdrawal of the igniter 10 out of its support 20. The igniter 10 comprises connection pins which are perpendicular to the shoulders so that the stresses caused by the placing and/or the withdrawal of a connector are made in an axial direction of the feet 11.

Note also the presence of a chamfer on the edge of the fixation orifice 25, brought in contact with the shoulder 17 of the igniter, which can also be chamfered in this zone in order to improve the relative positioning of the two components and also to increase the seal during operation.

Figure 2:
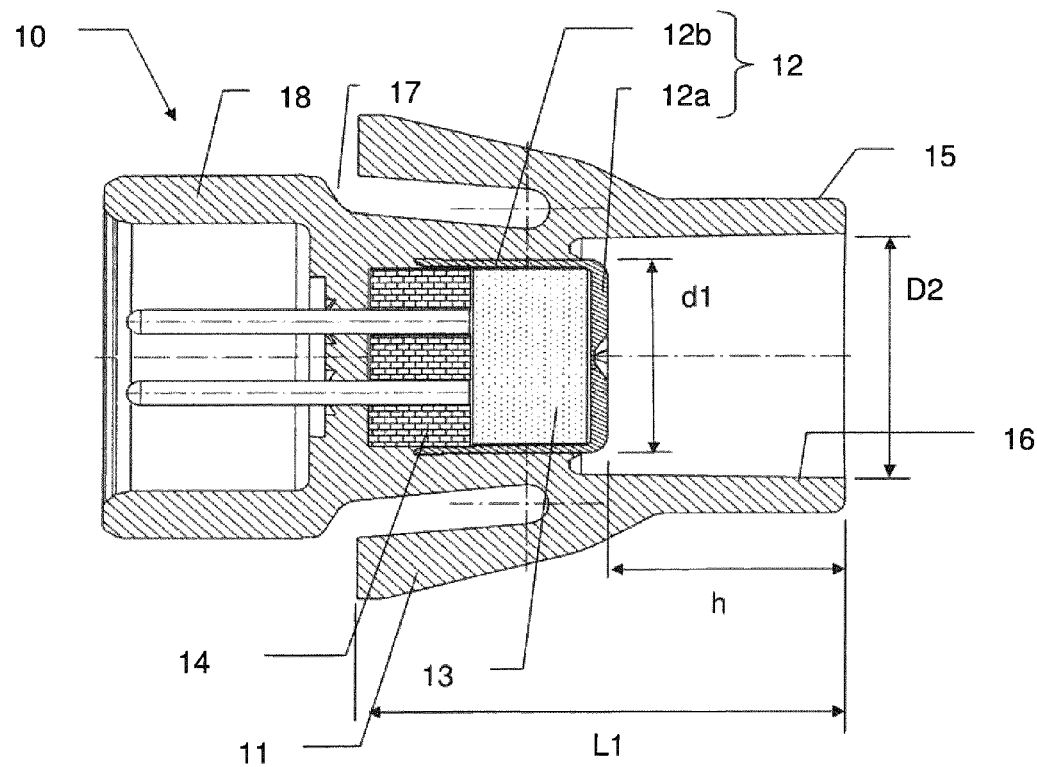
FIG. 2 shows a sectional view of the igniter of FIG. 1.

FIG. 2 shows a section of the igniter 10 of FIG. 1. The latter therefore comprises a plastic overmoulding 18 which surrounds a case 12 welded on a glass feedthrough 14 and enclosing a pyrotechnical material 13. A pit 16 formed in the plastic overmoulding 18 allows the case to open in order to allow gases and/or hot particles created during the operation of the igniter 10 to pass.

The operation of the igniter 10 is initiated by the igniting of the pyrotechnical material. Several techniques can be used such as, for example here the passage of an electrical current into a resistive element which will therefore heat up and bring about the ignition of the pyrotechnical material 13. The pressure in the case 12 rapidly increases and forces the case 12 to break.

The case 12 comprises a cylindrical wall 12b and a bottom 12a. In order to facilitate the opening of the case 12, the bottom 12a is petaled, preferably in eight sectors or petals in order to limit the risk of rupture and/or detachment of petals during the functioning of the igniter 10.

Furthermore, the thickness of the bottom 12a is greater than that of the wall 12b, which reduces even more the risk of rupture of petals as well as the angular amplitude of the opening of the petals.

The pit 16 has a depth h greater than or equal to one half the diameter d1 of the case. Consequently, the petals, once open, do not extend beyond the pit and can therefore not attack an element outside of the igniter 10 such as an airbag fabric which could be located in the vicinity. This furthermore allows a better guiding of the gases and/or particles generated during the igniting of the igniter 10 so that they are directly directed toward an airbag, for example. Moreover, the pit 16 has a diameter D2 greater than the diameter d1 so that the petals can open without being limited or striking the pit 16. The diameter D2 is ideally greater than the diameter d1 by 1.5 to 3 millimeters. This reduces the risk of rupture of the pit.

In addition, the end of the pit 16 is arranged at a distance L1 from the end of the feet 11 in order to limit the risk of leaks of the gases through the fixation interface of the igniter. The greater this distance is, the more the leaks will be limited. A minimum distance of 15 millimeters is appropriate for limiting these leaks.

Note that the feet 11 and the passages 21 may not be arranged in a symmetric manner along the axis of the igniter 10 but on the contrary can be arranged in an asymmetric manner in order to offer an angular keyway and correctly orient the pins of the igniter 10 relative to the support 20 and to the rest of the safety module.

Figure 3:
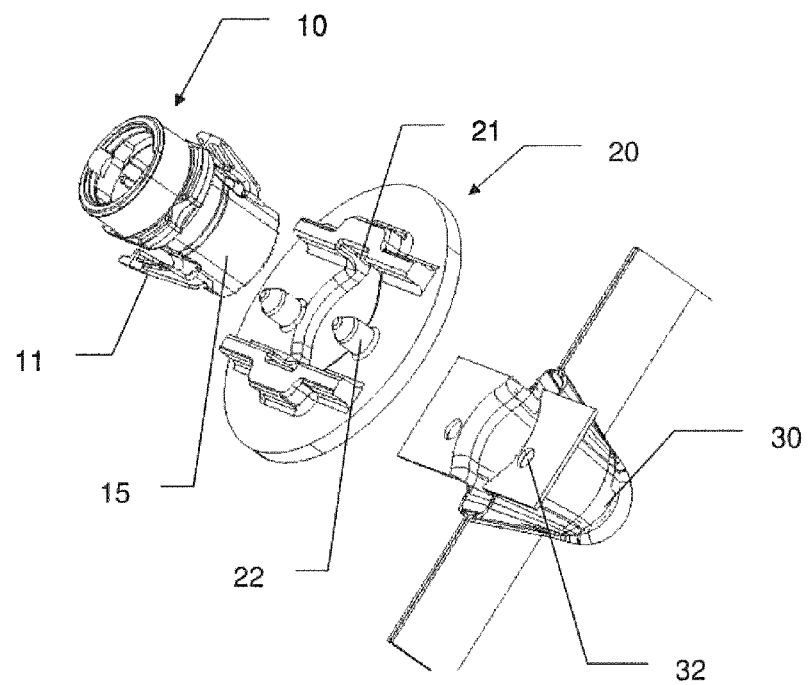
FIG. 3 shows an exploded view of a detail of a safety module on which the igniter of FIG. 1 is mounted.

FIG. 3 shows an exploded view of a device from FIG. 2, mounted with an airbag 30. The airbag 30 is mounted sandwiched between the support 20 and the igniter 10, which simplifies the design of the module because several functions are concurrently contained on the support 20 and the igniter 10: fixation of the igniter 10 and of the bag.

Furthermore, the support 20 comprises two teats 22, each one projecting on the face of the support 20 facing the igniter 10 and the airbag 30. The airbag comprises two holes 32 arranged facing the teats 22, which allows an operator to be able to insert, during the assembly of the safety module, the tongues of the airbag 30 into the fixation orifice 25 and to preposition the airbag 30 on the support 20 by threading the holes 32 on the teats 22 in order to then have the time to fix the igniter 10 on its support 20.

This implementation is interesting in the case in which the airbag 30 is a secondary device integrated in the safety cushion, which has the function of freeing a vent in order to lower a pressure prevailing in the safety cushion.

In this case the linkage connects the vent of the safety cushion to the airbag 30 and as long as the latter is not inflated, the linkage keeps the vent closed. In the scenario, where the pressure in the safety cushion should be limited, the igniter 10 is ignited and the airbag 30 is pressurized directly by the gases of the igniter 10, which brings about rupture of a meltable seam, for example, and frees the linkage, which no longer keeps the vent closed. The gases present in the safety cushion can then escape causing the pressure to drop in the safety cushion.

The present invention offers at least two improvements to the mounting procedure. A first advantage is the gain in time procured by the integration of the feet 11 directly to the plastic overmolding 18 of the igniter 10, which allows the latter to be mounted directly on the module.

A second advantage is to preposition the airbag 30 on the support 20, which allows the operator to split up the mounting operations relative to this airbag 30. Finally, the fixation of the airbag 30 sandwiched between the support 20 and the igniter 10 allows the holding in place of the airbag 30 to be made more reliable.

Figure 4:
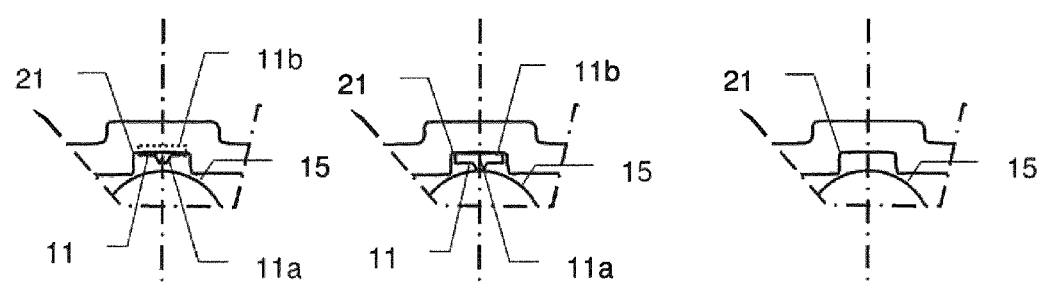
FIG. 4 shows a detail of the support and of the igniter inserted into the support according to three mounting scenarios.

FIG. 4 shows a top view of an igniter 10 inserted in a support 20 at the level of a passage 21 and of the corresponding foot 11 in order to illustrate three mounting scenarios.

The figure on the left shows a correct mounting. The foot 11 with a T-section is correctly placed in a position of blocking after insertion of the igniter 10. Only a first lower part 11a of the T is visible through the passage 21. A second part 11b with a greater area than the first part 11a is behind the support 20, represented in dotted lines. Therefore, it is possible to insert a checking fork comprising a central release into the passage 21 (which then acts as a checking opening) for verifying that the foot 11 is in the proper blocking position.

The figure in the middle illustrates a mounting scenario in which the foot 11 is incorrectly placed in a blocking position, which means that a withdrawal of the igniter 10 is possible. The rest of the T-shaped foot 11 is seen: the second part 11b with a greater area than the first part 11a, and it would be impossible to insert the checking fork because it would strike against the second part 11b of the T-shaped foot 11. This type of error can therefore be detected.

The figure on the right shows a mounting scenario with the foot 11 absent due to a rupture, for example. The entire passage 21 is free and the checking fork would completely pass without the central, hollowed-out part striking the first part 11a of the foot 11, which also makes this error detectable.

Figure 5:
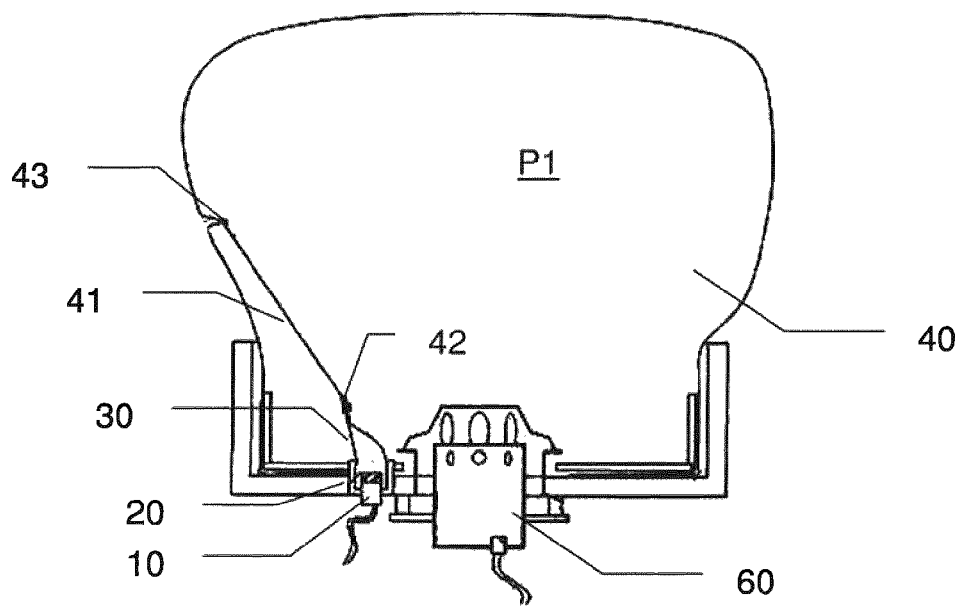
FIGS. 5 and 6 show a possible application for the security module in FIG. 3 according to two scenarios of operation.

FIG. 5 shows a safety module for an automobile comprising a safety airbag 40, a gas generator 60 designed to inflate the safety airbag 40, a pyrotechnical activating device (comprising an igniter 10 and a support 20), and an inflatable cushion 30 connected to a vent 43 of the safety airbag 40 by a linkage 41.

As is shown, the safety airbag 40 is deployed under the action of the inflating gases generated by the gas generator 60. A pressure P1 prevails in the safety airbag 40, which pressure is calculated, for example, to retain and cushion an occupant during a collision of the automobile with an obstacle. Under certain collision conditions or during a certain lapse of time during the retention of the occupant the pressure should be maintained in the safety airbag 40 and the vent 43 should remain closed. To this end the linkage 41 keeps it closed and it is kept taut by the airbag 30.

Figure 6:
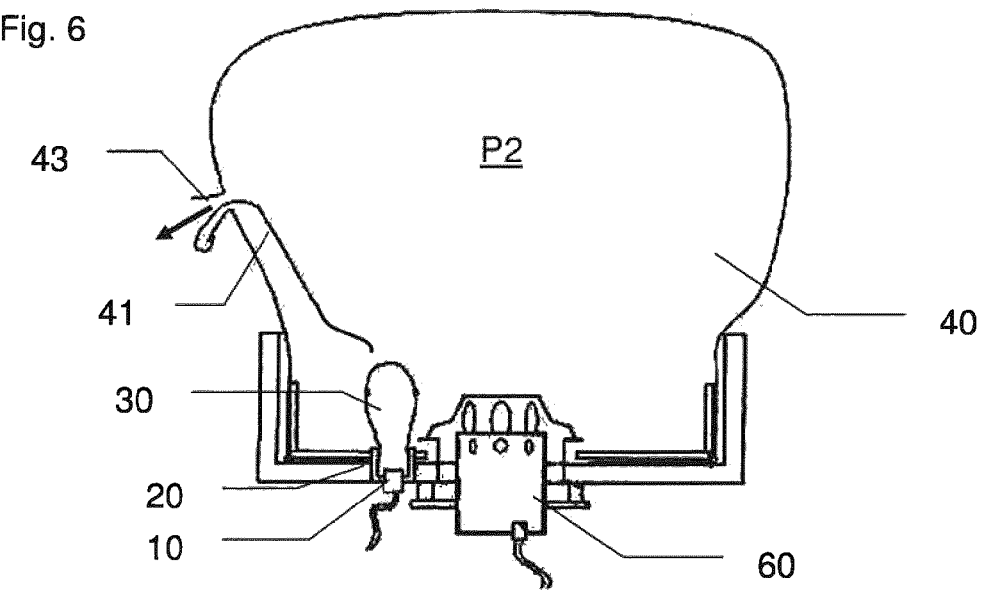

FIG. 6 shows the safety module of FIG. 5 with the vent 43 open. In fact, under certain collision conditions if the occupant is detected outside of his normal position, or at the end of the retention of the occupant it can be advantageous to lower the pressure in the security airbag 40. This is when the activating device is activated and releases the igniter 10 in order to inflate the airbag 30 in order to release the linkage 41 which is no longer taut and allows the vent 43 to open in order to obtain a pressure P2 lower than P1.

The igniter 10 of the activating device has inflated the airbag 30 and a meltable seam 42 (visible in FIG. 1) has broken, thus freeing the linkage 41.

It is understood that various modifications and/or improvements evident to a person skilled in the art can be added to the different embodiments of the invention described in the present description without leaving the scope of the invention defined by the attached claims. In particular, reference is made to an angular keyway obtained by making the feet 11 and the passages 21 asymmetrical but it is also possible to envision obtaining this function by making the teats 22 and the holes 32 asymmetrical and adding a passage for these teats in the plastic overmolding 18.

The invention claimed is:

1. A pyrotechnic igniter comprising:
    at least one pyrotechnic material for ignition by a heating element; and
    a case enclosing the at least one pyrotechnic material, a plastic overmoulding of the case forming a fixation interface of the igniter and inserted into a fixation orifice of a support up to an inserted position,
    wherein the fixation interface of the plastic overmoulding includes at least one deformable part designed elastically deformable during passage into the fixation orifice and elastically returnable to a blocking position against the support when the igniter is in the inserted position to prevent any withdrawal of the igniter,
    wherein the case is arranged in a pit of the plastic overmoulding to allow the case to open for passage of gases and hot particulates during operation of the pyrotechnic igniter at a depth greater than or equal to one half a diameter of the case.

2. The igniter according to claim 1, wherein the case includes a lateral wall and a bottom with a thickness greater than that of the lateral wall.

3. The igniter according to claim 1, wherein the case includes a bottom with weakened lines designed to cause a petaling of the bottom during the operation of the igniter, the bottom including eight or less petals.

4. The igniter according to claim 1, wherein the igniter includes a glass feedthrough to which the case is fixed, the at least one deformable part arranged on the plastic overmoulding facing a case zone between a welding and a bottom of the case.

5. The igniter according to the claim 4, wherein the welding is arranged to be facing the support when the igniter is in the inserted position.

6. The igniter according to claim 1, wherein the plastic overmoulding is made of polyamide 6.6 with 30% by mass of glass fibres.

7. The pyrotechnic igniter of claim 1, in combination with a motor vehicle.

8. The pyrotechnic igniter according to claim 1, wherein the case includes a cylindrical sidewall and bottom wall, the cylindrical sidewall axially terminating at the bottom wall.

9. The pyrotechnic igniter according to claim 1, wherein the plastic overmoulding forms a connection imprint at a level of connection pins designed to receive and retain a connector.

10. A pyrotechnic igniter comprising:
    at least one pyrotechnic material for ignition by a heating element; and
    a case enclosing the at least one pyrotechnic material, a plastic overmoulding of the case forming a fixation interface of the igniter and inserted into a fixation orifice of a support up to an inserted position,
    wherein the fixation interface of the elastic overmoulding includes at least one deformable part designed elastically deformable during passage into the fixation orifice and elastically returnable to a blocking position against the support when the igniter is in the inserted position to prevent any withdrawal of the igniter,
    wherein the case is arranged in a pit of the plastic overmoulding to allow the case to open for passage of gases and hot particulates during operation of the pyrotechnic igniter,
    wherein the case is arranged in the pit of the plastic overmoulding at a depth greater than or equal to one half a case diameter of the case,
    wherein the pit has a diameter two to three millimeters greater than that of the case.

11. A pyrotechnic igniter comprising:
    at least one pyrotechnic material for ignition by a heating element; and
    a case enclosing the at least one pyrotechnic material, a plastic overmoulding of the case forming a fixation interface of the igniter and inserted into a fixation orifice of a support up to an inserted position,
    wherein the fixation interface of the plastic overmoulding includes at least one deformable part designed elastically deformable during passage into the fixation orifice and elastically returnable to a blocking position against the support when the igniter is in the inserted position to prevent any withdrawal of the igniter,
    wherein the support has a checking opening, the deformable part includes a male part having a first part facing the checking opening when the deformable part has passed into the blocking position, and wherein the male part comprises a second part with a greater surface than the first part, the second part facing the checking opening when the igniter is in the inserted position with the deformable part remaining deformed.

12. The pyrotechnic igniter of claim 11, in combination with a vehicle safety module having at least one airbag.

13. The pyrotechnic igniter of claim 12, wherein the airbag is arranged between the support and the igniter.

14. The pyrotechnic igniter of claim 13, further comprising at least one projecting part and wherein the airbag comprises a hole into which a projecting part is threaded in order to position/maintain the airbag on pyrotechnic igniter.

15. The safety module of claim 12, in combination with a motor vehicle.

* * * * *